United States Patent
Nazaran et al.

(10) Patent No.: US 9,790,317 B2
(45) Date of Patent: Oct. 17, 2017

(54) AQUEOUS POLYURETHANE DISPERSION COMPRISING A TEREPHTHALIC ACID POLYESTER

(71) Applicant: Bayer MaterialScience AG, Monheim Am Rhein (DE)

(72) Inventors: Pantea Nazaran, Köln (DE); Rolf Gertzmann, Leverkusen (DE); Hiroshi Morita, Shijonawate (JP); Nakao Makoto, Nishinomiya (JP)

(73) Assignee: Covestro Deutschland AG, Leverkusen (DE)

( * ) Notice: Subject to any disclaimer, the term of this patent is extended or adjusted under 35 U.S.C. 154(b) by 187 days.

(21) Appl. No.: 14/416,688

(22) PCT Filed: Jul. 23, 2013

(86) PCT No.: PCT/EP2013/065508
§ 371 (c)(1),
(2) Date: Jan. 23, 2015

(87) PCT Pub. No.: WO2014/016294
PCT Pub. Date: Jan. 30, 2014

(65) Prior Publication Data
US 2015/0175737 A1    Jun. 25, 2015

(30) Foreign Application Priority Data
Jul. 26, 2012   (EP) .................................... 12177935

(51) Int. Cl.
C08G 18/08    (2006.01)
C08G 18/66    (2006.01)
C08G 18/75    (2006.01)
C09D 175/06   (2006.01)

(52) U.S. Cl.
CPC ..... *C08G 18/6607* (2013.01); *C08G 18/0819* (2013.01); *C08G 18/0823* (2013.01); *C08G 18/0828* (2013.01); *C08G 18/664* (2013.01); *C08G 18/6644* (2013.01); *C08G 18/6651* (2013.01); *C08G 18/6655* (2013.01); *C08G 18/6659* (2013.01); *C08G 18/758* (2013.01); *C09D 175/06* (2013.01)

(58) Field of Classification Search
CPC .............. C08G 18/6607; C08G 18/664; C08G 18/6644; C08G 18/6651; C08G 18/6655; C08G 18/6659; C08G 18/0819; C08G 18/0823; C08G 18/0828; C08G 18/758; C09D 175/06

See application file for complete search history.

(56) References Cited

U.S. PATENT DOCUMENTS

| | | | | |
|---|---|---|---|---|
| 4,948,829 A | * | 8/1990 | Mitsuji | C08G 18/0823 524/457 |
| 5,804,647 A | * | 9/1998 | Nachtkamp | C08G 18/0819 524/591 |
| 6,566,438 B1 | * | 5/2003 | Ingrisch | C08G 18/0823 524/507 |
| 2009/0136732 A1 | | 5/2009 | Uchida et al. | |
| 2010/0210757 A1 | | 8/2010 | Sommer et al. | |
| 2011/0136964 A1 | * | 6/2011 | Golchert | C08K 5/0041 524/523 |
| 2012/0095164 A1 | | 4/2012 | Blum et al. | |
| 2016/0272872 A1 | * | 9/2016 | Vo | C09K 8/56 |

FOREIGN PATENT DOCUMENTS

| | | |
|---|---|---|
| EP | 1798248 A1 | 6/2007 |
| EP | 2218739 A1 | 8/2010 |
| EP | 2287260 A1 | 2/2011 |

OTHER PUBLICATIONS

Odian, G., Principles of Polymerization, third edition, 1991, pp. 19-33.*
International Search Report for PCT/EP2013/065508 mailed Aug. 21, 2013.

* cited by examiner

*Primary Examiner* — Patrick Niland
(74) *Attorney, Agent, or Firm* — Drinker Biddle & Reath LLP

(57) ABSTRACT

The present invention relates to an aqueous polyurethane dispersion obtainable by the reaction of at least: (A) one polyisocyanate with two or more isocyanate groups, (B) one polyester component comprising (B1) a polyesterpolyol with a mean molecular weight of 300 to 900 g/Mol, having structural units derived from terephthalic acid, (C) one ionic group introducing compound with at least one sulphonate and/or carboxylate group and at least one isocyanate reactive group, (D) one diol with a mean molecular weight of 62 to 400 g/Mol, (E) one polyol with a mean molecular weight of 62 to 400 g/Mol, having three or more hydroxyl groups, (F) one amino functional and/or aminohydroxyl functional compound, its use to coat a substrate and a coating obtained by using the dispersion.

14 Claims, No Drawings

AQUEOUS POLYURETHANE DISPERSION COMPRISING A TEREPHTHALIC ACID POLYESTER

CROSS-REFERENCE TO RELATED APPLICATIONS

This application is a national stage application (under 35 U.S.C. §371) of PCT/EP2013/065508, filed Jul. 23, 2013, which claims benefit of European Application No. 12177935.9, filed Jul. 26, 2012, both of which are incorporated herein by reference in their entirety.

The present invention relates to an aqueous polyurethane dispersion, its use to coat a substrate and a coating obtained by using the dispersion.

Aqueous polyurethane dispersions and their application in coatings are well known in the art. For example EP 1 798 248 A1 discloses an aqueous polyurethane dispersion which is obtainable by the reaction of a polyisocyanate, a polyesterpolyol, a ionic group introducing compound with a carboxylate group and an isocyanate reactive group and one amino functional compound. However, coatings obtained from prior art dispersions do not have the properties necessary for certain applications, where high mechanical and chemical resistance at the same time are required. For example either their hardness is insufficient, or their chemical and mechanical resistance needs further improvement.

Accordingly it was an object of the present invention to provide an aqueous polyurethane dispersion which can be used to make coatings showing high hardness in combination with good chemical and mechanical resistance. This object is solved by an aqueous polyurethane dispersion obtainable by the reaction of at least:
- (A) one polyisocyanate with two or more isocyanate groups,
- (B) one polyester component comprising
  - (B1) a polyesterpolyol with a mean molecular weight of 300 to 900 g/Mol, having structural units derived from terephthalic acid,
- (C) one ionic group introducing compound with at least one sulphonate and/or carboxylate group and at least one isocyanate reactive group,
- (D) one diol with a mean molecular weight of 62 to 400 g/Mol,
- (E) one polyol with a mean molecular weight of 62 to 400 g/Mol, having three or more hydroxyl groups,
- (F) one amino functional and/or aminohydroxyl functional compound.

Surprisingly it has been found that coatings made from this dispersion show a significantly higher hardness. Further their chemical and mechanical resistance is improved.

Preferably the polyester (B) comprises at least two hydrogen atoms being reactive with isocyanates. More preferably the polyester (B) has 2 to 4, more preferably 2 to 3 and most preferably 2 hydroxyl groups as isocyanate reactive groups.

Polyester (B) includes for example linear polyesters and slightly branched polyesters which can be prepared from aliphatic, cycloaliphatic or aromatic di- or polycarboxylic acids such as succinic, methyl succinic, glutaric, adipic, pimelic, suberic, azelaic, sebacic, nonane dicarboxylic, decane dicarboxylic, terephthalic, isophthalic, o-phthalic, tetrahydrophthalic, hexahydrophthalic, cyclohexane-dicarboxylic, maleic, fumaric, malonic or trimellitic acid and also from acid anhydrides such as o-phthalic, trimellitic or succinic acid anhydride or mixtures thereof with polyhydric alcohols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 3-Methyl-1,5-Pentandiol, 1,4-dihydroxycyclohexane, 1,4-dimethylolcyclohexane, octanediol-1,8, decanediol-1,10, dodecanediol-1,12 or mixtures thereof, also using higher functional polyols such as trimethylolpropane, glycerine or pentaerythrite, where appropriate. Of course, cycloaliphatic and/or aromatic di- and polyhydroxyl compounds can also be used to make the polyester. Instead of the free polycarboxylic acid, the corresponding polycarboxylic acid anhydrides or corresponding polycarboxylic acid esters of low-order alcohols or mixtures thereof may also be used to make the polyester (B).

The polyester (B) may comprise a homo- or copolymer of lactones which are preferably obtained by the addition of lactones or lactone mixtures such as butyrolactone, ε-caprolactone and/or methyl-ε-caprolactone to suitable di- or higher functional starter molecules such as the low-molecular, polyhydric alcohols mentioned above.

Particularly preferred are polyesters derived from isophthalic acid and/or terephthalic acid and other dicarboxylic acids and alcohols such as 3-methyl-1,5-pentandiol and/or ethyleneglycol and/or butanediol and/or hexanediol.

Most particularly preferred are polyesters derived from isophthalic acid and/or terephthalic acid, and 3-methyl-1,5-pentandiol.

According to a preferred embodiment of the invention the mean molecular weight of the polyesterpolyol (B1) is 400 to 800, preferably 450 to 700, more preferably 480 to 600 and most preferably 500 to 550.

It is also preferred if the polyesterpolyol (B1) comprises structural units derived from 3-methyl-1,5-penandiol.

Further the polyol component (B) may additionally comprise a polyesterpolyol (B2) with a mean molecular weight of 1000 to 4000 g/Mol, having structural units derived from terephthalic acid.

The mean molecular weight of the polyesterpolyol (B2) can be 1500 to 3500, preferably 1700 to 3000, more preferably 1800 to 2500 and most preferably 1900 to 2200. A dispersion is also preferred wherein the polyesterpolyol (B2) comprises structural units derived from 3-methyl-1,5-penandiol.

The ratio between the polyesterpolyol (B1) and the polyesterpolyol (B2) may be between 100:0 to 40:60, preferably between 90:10 to 50:50, more preferably between 80:20 to 60:40 and most preferably between 70:30 to 65:35.

Suitable polyisocyanates (A) are any organic compounds which contain at least two free isocyanate groups per molecule. Preferably, diisocyanates $Y(NCO)_2$ are used, wherein Y represents a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms, or a divalent araliphatic hydrocarbon radical having 7 to 15 carbon atoms. Examples of such preferred diisocyanates are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (=IPDI, isophorone diisocyanate), 4,4'-diisocyanato-dicyclohexylmethane, 4,4'-diisocyanato-dicyclohexylpropane-(2,2), 1,4-diiso_cyanatobenzene, 2,4-diisocyanatotoluene, 2,6-diisocyanatotoluene, 4,4'-diisocyanato-diphenyl_methane, 2,2'- and 2,4'-diisocyanatodiphenylmethane, tetramethylxylylene diisocyanate, p-xylylene diisocyanate, p-isopropylidene diisocyanate and mixtures comprising or consisting of these compounds.

According to a preferred embodiment the polyisocyanate (A) has two isocyanate groups and is preferably an aliphatic or araliphatic diisocyanate. Most preferably the polyisocyanate (A) comprises one or more compounds selected from hexamethylene diisocyanate, 1,4-diisocyanatocyclohexane, 1-isocyanato-3,3,5-trimethyl-5-isocyanatomethyl-cyclohexane, 4,4'-diisocyanato-dicyclohexyl-methane, 4,4'-diisocyanato-dicyclohexylpropane-(2,2).

Particularly preferred polyisocyanates (A) are hexamethylene diisocyanate, 1-isocyanato-3,3,5-trimethyl-5-isocyanatomethyl-cyclohexane, 4,4'-diisocyanato-dicyclohexyl-methane, 2,4-diisocyanatotoluene and 2,6-diisocyanatotoluene and mixtures of these compounds.

Most preferred is 4,4'-diisocyanato-dicyclohexyl-methane.

In addition to these simple diisocyanates, polyisocyanate are also suited which contain heteroatoms in the radical linking of the isocyanate groups and/or have a functionality of more than 2 isocyanate groups per molecule. The first ones, for instance, are polyisocyanates prepared by the modification of simple aliphatic, cycloaliphatic, araliphatic and/or aromatic diisocyanates with a uretdione, isocyanurate, urethane, allophanate, biuret, carbodiimide, iminooxadiazin dione and/or oxadiazin trione structure. One example of a modified polyisocyanate with more than 2 isocyanate groups per molecule is 4-isocyanatomethyl-1,8-octanediisocyanate (nonanetriisocyanate).

The polyisocyanate (A) may be present in the polyurethane according to the invention in quantities of 30 to 60, preferably of 35 to 60, and more preferably in quantities of 40 to 57% by weight, based on the solid content of the dispersion.

The ionic group introducing compound (C) comprises at least one isocyanate reactive group. An isocyanate reactive group comprises at least one Zerewitinoff active hydrogen atom. Examples of functional groups with Zerewitinoff active hydrogen atoms are OH, SH, NH.

Suitable ionic group introducing compounds (C) are for example diamino compounds or dihydroxy compounds which additionally carry sulphonate and/or carboxylate groups such as the sodium, lithium, potassium, tert,-amine salts of N-(2-aminoethyl)-2-aminoethane sulphonic acid, N-(3-aminopropyl)-2-aminoethane sulphonic acid, N-(3-aminopropyl)-3-aminopropane sulphonic acid, N-(2-aminoethyl)-3-aminopropane sulphonic acid, the analogous carboxyl acids, dimethylol propionic acid, dimethylol butyric acid, the reaction products in the sense of a Michael condensation of 1 Mol diamine such as 1,2-ethane diamine or isophorone diamine with 2 mol acrylic acid or maleic acid.

Preferred compounds (C) are N-(2-aminoethyl)-2-aminoethane sulphonate or dimethylol propionic acid. The acids are employed directly in their salt form as sulphonate or carboxylate.

However, it is also possible to add the neutralizing agents partly or completely during or after the manufacture of the polyurethanes only.

Suitable and preferred neutralizing agents for the salt formation are triethylamine, dimethylcyclohexylamine, ethyldiisopropylamine, for example.

Other amines such as ammonia, diethanolamine, triethanolamine, dimethylethanolamine, methydiethanolamine, aminomethylpropanol and also mixtures of the aforementioned may be employed for the salt formation. It is expedient for these amines to be added only after substantial reaction of the isocyanate groups.

It is also possible to use other neutralizing agents such as sodium, potassium, lithium, calcium hydroxide for neutralizing purposes.

Most preferably the ionic group introducing compound (C) may comprise N-(2-aminoethyl)-2-aminoethane sulphonate and/or dimethylol propionic acid.

The component (C) is contained in the polyurethane according to the invention at 1,5 to 8, preferably at 2 to 8 and more preferably at 4 to 7% by weight, based on the solid content of the dispersion.

The diol compound (D) may comprise one or more compounds selected from ethanediol, di-, tri-, tetraethyleneglycol, 1,2-propanediol, di-, tri-, tetrapropyleneglycol, 1,3-propanediol, butanediol-1,4, butanediol-1,3, butanediol-2,3, pentanediol-1,5, hexanediol-1,4, 2,2-dimethyl-1,3-propanediol, 1,4-dihydroxycyclohexane, 1,4-dimethylolcyclohexane, octanediol-1,8, decanediol-1,10, dodecanediol-1,12, neopentylglycol, 1,4-cyclohexanediol, 1,4-cyclohexanedimethanol, 1,4-, 1,3-, 1,2-dihydroxybenzene or 2,2-bis-(4-hydroxyphenyl)-propane (bisphenol (A)), 3-Methyl-1,5-pentandiol. Most preferred is if the diol (D) comprises or consists of 1,6-Hexanediol.

The diol (D) may be present in the polyurethane according to the invention in quantities of 1 to 8, preferably of 2 to 8 and more preferably in quantities of 3 to 7% by weight, based on the solid content of the dispersion.

According to another preferred embodiment of the invention the polyol (E) may comprise one or more compounds selected from trimethylolpropane, glycerine, pentaerythrite, dipenthaerytrite.

The polyol (E) may be present in the polyurethane according to the invention in quantities of 0.1 to 4, preferably of 0.5 to 4 and more preferably in quantities of 0.7 to 2% by weight, based on the solid content of the dispersion.

Suitable amino functional and/or aminohydroxyl functional compounds (F) are mono-, di-, trifunctional amines and/or mono-, di-, trifunctional hydroxyamines such as aliphatic and/or alicyclic primary and/or secondary monoamines such as ethylamine, diethylamine, the isomer propyl and butylamines, higher linearly aliphatic monoamines and cycloaliphatic monoamines such as cyclohexylamine. Further examples are aminoalcohols, i.e. compounds which contain amino and hydroxyl groups in one molecule such as ethanolamine, N-methylethanolamine, diethanolamine, diisopropanolamine, 1,3-diamino-2-propanol, N-(2-hydroxyethyl)-ethylenediamine, N,N-bis(2-hydroxyethyl)-ethylenediamine and 2-propanolamine. It is also possible to use diamines and triamines such as 1,2-ethanediamine, 1,6-hexamethylenediamine, 1-amino-3,3,5-trimethyl-5-aminomethyl-cyclohexane (isophoronediamine), piperazine, 1,4-diaminocyclohexane, bis-(4-aminocyclohexyl)-methane and diethylenetriamine. Additional examples are adipic acid dihydrazide, hydrazine or hydrazine hydrate. Mixtures of the aforementioned compounds may be used.

Preferred compounds (F) are 1,2-ethanediamine, 1-amino-3,3,5-trimethyl-5-aminomethyl-cyclohexane (isophoronediamine), diethylenetriamine, diethanolamine, ethanolamine, N-(2-hydroxyethyl)-ethylenediamine and N,N-bis(2-hydroxyethyl)-ethylenediamine. Particularly preferred components (F) are 1,2-ethanediamine and isophoronediamine.

The amino functional and/or aminohydroxyl functional compound (F) may be present in the polyurethane according to the invention in quantities of 0.5 to 12, preferably of 0.5 to 10 and more preferably in quantities of 1 to 10% by weight, based on the solid content of the dispersion.

In a particularly preferred embodiment, this polyurethane dispersion is obtainable by the reaction of a polyester (B) comprising a polyesterpoly (B1) having structural units derived from terephthalic acid and from 3-methyl-1,5-pentanediol, 4,4'-diisocyanato-dicyclohexyl-methane as polyisocyanate (A), 3-Methyl-1,5-pentandiol as diol (D), trimethylolpropane as polyol (E), the triethylamine salt of dimethylol propionic acid as ionic group introducing compound (C) and diethanolamines and/or isophoronediamine as amino functional and/or aminohydroxyl functional compound (F).

In still another embodiment of the invention the dispersion is obtainable by the reaction of 30 to 60, preferably of 35 to 60, and more preferably 40 to 57% per weight of the polyisocyanate (A), 15 to 50, preferably at 15 to 45 and more preferably at 15 to 40% per weight of the polyester (B), 1.5 to 8%, preferably 2 to 8 and more preferably 4 to 7 per weight of the ionic group introducing compound (C), 1 to 8, preferably of 2 to 8 and more preferably 3 to 7% per weight of the diol (D), 0.1 to 4, preferably of 0.5 to 4 and more preferably 0.7 to 2% per weight of the polyol (E) and 0.5 to 12, preferably of 0.5 to 10 and more preferably 1 to 10% per weight of the amino functional and/or aminohydroxyl functional compound (F), wherein the sum of all percentages adds up to 100.

The aqueous polyurethane dispersions may be prepared in such a manner that compounds (A), (B), (C), (D) and optionally (E) are transformed in a single- or multi-stage reaction into an isocyanate-functional prepolymer which subsequently, in a single- or multi-stage reaction, is chain extended with compound (F), and then dispersed in or with water, wherein the solvent used, if any, may be removed partly or completely by distillation during or after the dispersion.

The preparation may be performed in one or more stages in homogeneous or, in the case of a multi-stage reaction, partly in disperse phase. After the completely or partly performed polyaddition a dispersing, emulsifying or dissolving step is carried out. Subsequently, a further polyaddition or modification is optionally carried out in disperse phase. All methods known in the prior art such as emulsifier-shear force, acetone, prepolymer-mixing, melt-emulsifying, ketimine and solid-matter spontaneous dispersing methods or derivatives thereof may be used for the manufacture. A summary of these methods is to be found in Methoden der organischen Chemie (Methods of Organic Chemistry) (Houben-Weyl, extension and continuation volumes to the 4th edition, volume E20, H. Bartl and J. Falbe, Stuttgart, New York, Thieme 1987, pp. 1671-1682). The melt-emulsifying, prepolymer-mixing and acetone methods are preferred. The acetone method is particularly preferred.

Conventionally, for the manufacture of a polyurethane polymer in a reactor compounds (B), (C), (D) and € are filled in first, optionally diluted with a solvent which is mixable with water but inert to isocyanate groups, and then homogenized. Subsequently, at room temperature up to 120° C., the compound (A) is added and an isocyanate-functional polyurethane prepolymer is manufactured.

Suitable solvents are for example acetone, methylisobutylketone, butanone, tetrahydrofurane, dioxane, acetonitrile, dipropylene glycol dimethyl ether and 1-methyl-2-pyrrolidone, which may be added not only at the beginning of the manufacture but optionally also in part later. Acetone and butanone are preferred. It is possible to perform the reaction at normal pressure or elevated pressure.

For the manufacture of the prepolymer the quantities of the hydroxyl- and, where appropriate, amino-functional components are selected such as to result in an isocyanate index of 1.05 to 2.5, preferably of 1.15 to 1.95, more preferably of 1.2 to 1.7.

The further transformation, the so-called chain extension, of the isocyanate-functional prepolymer with compound (F) is done such that a chain extension degree of 25 to 150, preferably of 40 to 85% of hydroxyl and/or amino groups, based on 100% of isocyanate groups, is achieved.

The chain extension degree is conventionally monitored by tracking the NCO content of the reaction mixture. Additionally, spectroscopic measurements, e.g. infrared or near-infrared spectra, determinations of the refractive index as well as chemical analyses such as titrations of samples taken may be carried out.

For the acceleration of the isocyanate addition reaction, conventional catalysts such as are known by those skilled in the art for the acceleration of the NCO—OH reaction may be employed. Examples are 1,4-diazabicyclo-[2,2,2]-octane, dibutyl tin oxide, tin dioctoate or dibutyl tin dilaurate, tin-bis-(2-ethylhexanoate) or other metallo-organic compounds.

The chain extension of the isocyanate-functional prepolymer with compound (F) may be performed before the dispersion, during the dispersion or after the dispersion. However, the chain extension is preferably performed before the dispersion. The chain extension is conventionally performed at temperatures of 10 to 100° C., preferably of 25 to 60° C.

Compound (F) for the chain extension may be added to the reaction mixture diluted with organic solvents and/or with water.

To make the dispersion, the prepolymer may be charged into dispersing water or the dispersing water may be stirred with strong shearing action such as strong agitation into the prepolymer. Subsequently, the chain extension may then be carried out if it has not already taken place in the homogeneous phase.

During and/or after dispersing, the organic solvent used, if any, such as acetone is distilled off.

A second aspect of the invention relates to a method of coating a substrate, comprising the step of coating the substrate with a dispersion according to the present invention.

The dispersion may for example be applied by spraying, with plain rollers, gravure rollers, screen rollers, in serigraphy, also rotary serigraphy, and with a doctor-blade spreader, a chambered doctor blade or a rotary doctor blade.

Preferred substrates include: Wood substrates such as oak wood, birch wood, maple wood and mahogany wood. Further preferred substrates are melamine substrates, plexiglass (polymethylmethacrylate, PMMA) and MDF (medium density fiberboard) substrates.

A third aspect of the present invention relates to the use of an inventive dispersion to coat a substrate, preferably made of wood.

A forth aspect of the present invention relates to a coating obtained by using an inventive dispersion.

In the following the invention in described in more detail by means of examples.

Substances:
Desmodur W 4,4'-Diisocyanatodicyclo-hexylmethane. Bayer AG, Leverkusen, DE
Kuraray P-520 polyester polyol of terephthalic acid and 3-methyl-1,5-pentandiol with a mean molecular weight of 500 g/mol, Kuraray, Japan Kuraray P-2020 polyester polyol of terephthalic acid and 3-methyl-1,5-pentandiol with a mean molecular weight of 2000 g/mol, Kuraray, Japan P 200 H/DS polyester polyol of phthalic acid and 1,6-Hexanediol with a mean molecular weight of 2000 g/mol, Bayer AG, Leverkusen, DE DMPS Dimethylol propionic acid 3-MPD 3-methyl-1,5-pentandiol TMP trimethylolpropane HDO 1,6-Hexanediol TEA Triethylamine IPDA 1-amino-3,3,5-trimethyl-5-aminomethyl-cyclohexane (isophoronediamine)

EDA 1,2-ethanediamine

Byk 028 Formulation additive. Byk Chemie, Wesel, DE

Byk 346 Formulation additive. Byk Chemie, Wesel, DE

Methods:

Determination of the Solid Matter Content

The solid matter content was determined in accordance with DIN-EN ISO 3251.

Determination of the Isocyanate Content

The isocyanate content was determined in accordance with DIN-EN ISO 11909, and indicated in %, back titration with 0.1 mol/l hydrochloric acid after reaction with butylamine.

Determination of the OH— and Acid-Value

The OH value is determined according to DIN 53240 and the acid value is determined according to DIN-EN ISO 2114.

Determination of the Particle Diameter

The average particle size (APS) was determined by laser correlation spectroscopy (apparatus: Malvern Zetasizer 1000, Malvern Instruments LTD), and the Z-averages are given.

Determination of the Mean Molecular Weight

The weight average molecular weights Mw were determined by GPC (Gel Permeation Chromatography):

Apparatus: Hewlett Packard 1100 series II with refraction index detector

Column heating installation: VDS-Optilab Jetstream 2 Plus

Columns: 1. PSS HEMA 40; 50×7.8 mm; Polymer Standard Services

2. Suprema 1000; 300×7.8 mm; Polymer Standard Services

3. PSS HEMA 300; 300×7.8 mm; Polymer Standard Services

4. PSS HEMA 40; 300×7.8 mm; Polymer Standard Services

5. PSS HEMA 40; 300×7.8 mm; Polymer Standard Services

Mobile phase: dimethylacetamide

Conditions: flow rate 0.6 ml/min; pressure 110 bar, temperature 30° C.

Standard: PSS Polymer—Standard—Service GmbH, Mainz; Germany

König pendulum hardness

König pendulum hardness was determined according to DIN 53157/DIN EN ISO 1522.

Micro-Hardness

Micro-hardness was determined according to DIN EN ISO 14577 and presented as the measured values for the required power for the penetration of a 200 nm narrow indentor into the coated glass plates.

Pencil Hardness

Pencil hardness was determined according to DIN EN 13523-4. Results are changing from the softest pencil 8B to the hardest 8H (8B< . . . <B<HB<F<H<2H <θ . . . <8H).

Rub Resistance

Rub resistance was evaluated according to DIN EN 13523-11 and graded according the number of double rubs by hand with a piece of cotton impregnated with a solvent like ethanol or methylethylketone.

Chemical Resistance

Chemical Resistance was evaluated according to DIN EN 12720:2009-07 and graded using an numerical evaluation scale where 1 is the worst and 5 is the best grade. Dispersions were doctor-bladed onto the substrate in a thickness of 200 μm. Pinewood panels were sanded (120 grit) beforehand.

Grade 5—No change; Test area indistinguishable from adjacent surrounding area.

Grade 4—Minor change; Test area distinguishable from adjacent surrounding area, only when the light source is mirrored on the test surface and is reflected towards the observer's eye, e. g. discoloration. change in gloss and color. No change in the surface structure, e.g. swelling, fiber raising, cracking, blistering.

Grade 3—Moderate change; Test area distinguishable from adjacent surrounding area, visible in several viewing directions, e. g. discoloration, change in gloss and colour. No change in the surface structure, e.g. swelling, fibre raising, cracking, blistering.

Grade 2—Significant change; Test area clearly distinguishable from adjacent surrounding area, visible in several viewing directions, e. g. discoloration, change in gloss and colour.

Grade 1—Strong change; Test area clearly distinguishable from adjacent surrounding area, visible in several viewing directions, e. g. discoloration, change in gloss and colour, and/or the surface material being totally or partially removed, and/or the filter paper adhering to the surface.

Friction Coefficient

Friction coefficient was evaluated according to DIN EN ISO 8295 with a tensile test instrument of Zwicki 2,5KN. Friction energy was evaluated by rubbing a piece of rubber (weight: 200 g) with a constant speed of 300 mm/min on the coated glass plates. The results are the average values of three measurements and are presented in terms of dynamic friction power [N] and the dynamic friction coefficient μD.

Mechanical Properties of Free Films

Mechanical properties of free films were evaluated according to DIN EN ISO 527-3 with a tensile test instrument of Zwicki 2,5KN. Test specimen were free films of type 5 A. The results are the average values of three measurements and are presented in terms of E-module and elongation at break.

Preparation of Dispersions:

Dispersion 1 (Inventive, I-1): Aqueous One-Component (1K) Polyurethane Dispersion 307 g of acetone were added to a mixture consisting of 174 g of Kuraray Polyol® P-520, 58 g of DMPS, 10 g of TMP, and 74 g of 3-MPD at 55° C. 603 g of Desmodur W were added and the reaction mixture was refluxed at a temperature of 70° C. until an NCO content of 5.3% was reached. After cooling down to 60° C. 33 g of TEA were added to the prepolymer and homogenized shortly. 1081 g of the prepolymer were dispersed whilst stirring vigorously in 1471 g of water which had been heated to a temperature of 30° C. After 5 minutes a solution of 90 g of IPDA in 134 g of water was added within 10 minutes. The mixture was stirred at 40° C. to react the isocyanate groups completely until no more NCO could be detected by IR spectroscopy.

After cooling, the mixture was filtered through a Seitz T5500 filter. The dispersion formed had the following properties:
Solids content: 35.2%
Average particle size: 44 nm
pH (10% dilution): 8.2

Dispersion 2 (Inventive, I-2): Aqueous One-Component (1K) Polyurethane Dispersion 197 g of acetone were added to a mixture consisting of 33 g of Kuraray Polyol® P-520, 134 g of Kuraray Polyol® P-2020, 31 g of DMPS, 5 g of TMP, and 21 g of 3-MPD at 55° C. 193 g of Desmodur W were added and the reaction mixture was refluxed at a temperature of 70° C. until an NCO content of 1.8% was reached. After cooling down to 60° C. 17 g of TEA added to the prepolymer and homogenized shortly. 550 g of the prepolymer were dispersed whilst stirring vigorously in 633 g of water which had been heated to a temperature of 30° C. After 5 minutes a solution of 4 g of IPDA and 3 g EDA in 51 g of water was added within 10 minutes. The mixture was stirred at 40° C. to react the isocyanate groups completely until no more NCO could be detected by IR spectroscopy. After cooling, the mixture was filtered through a Seitz T5500 filter. The dispersion formed had the following properties:
Solids content: 35.0%
Average particle size: 23 nm
pH (10% dilution): 8.1

Dispersion 3 (Inventive, I-3): Aqueous One-Component (1K) Polyurethane Dispersion 206 g of acetone were added to a mixture consisting of 91 g of Kuraray Polyol® P-520, 31 g of DMPS, 5 g of TMP, and 39 g of 3-MPD at 55° C. 314 g of Desmodur W were added and the reaction mixture was refluxed at a temperature of 70° C. until an NCO content of 1.6% was reached. After cooling down to 60° C. 15 g of Dimethylethanolamine added to the prepolymer and homogenized shortly. 550 g of the prepolymer were dispersed whilst stirring vigorously in 660 g of water which had been heated to a temperature of 30° C. After 5 minutes 15 g EDA in 55 g of water was added within 10 minutes. The mixture was stirred at 40° C. to react the isocyanate groups completely until no more NCO could be detected by IR spectroscopy. After cooling, the mixture was filtered through a Seitz T5500 filter. The dispersion formed had the following properties:
Solids content: 36.0%
Average particle size: 39.2 nm
pH (10% dilution): 8.2

Dispersion 4 (Comparative, C-1): Aqueous One-Component (1K) Polyurethane Dispersion 173 g of acetone were added to a mixture consisting of 268 g of Kuraray Polyol® P-2020, 31 g of DMPS, 5 g of TMP and 21 g of 3-MPD at 55° C. 193 g of Desmodur W were added and the reaction mixture was refluxed at a temperature of 70° C. until an NCO content of 1.6% was reached. After cooling down to 60° C. 17 g of TEA added to the prepolymer and homogenized shortly. 550 g of the prepolymer were dispersed whilst stirring vigorously in 610 g of water which had been heated to a temperature of 30° C. After 5 minutes a solution of 3 g of IPDA and 3 g EDA in 53 g of water was added within 10 minutes. The mixture was stirred at 40° C. to react the isocyanate groups completely until no more NCO could be detected by IR spectroscopy. After cooling, the mixture was filtered through a Seitz T5500 filter. The dispersion formed had the following properties:
Solids content: 38.4%
Average particle size: 23 nm
pH (10% dilution): 7.8

Dispersion 5 (Comparative, C-2): Aqueous One-Component (1K) Polyurethane Dispersion 110 g of acetone were added to a mixture consisting of 218 g of polyester P 200 H/DS® (polytetrametylene glycol polyether polyol with a mean molecular weight of 2000 g/mol), 29 g of DMPS and 14 g of 3-MPD at 55° C. 185 g of Desmodur W were added and the reaction mixture was refluxed at a temperature of 70° C. until an NCO content of 4.2% was reached. After cooling down to 60° C. 16 g of TEA added to the prepolymer and homogenized shortly. 500 g of the prepolymer were dispersed whilst stirring vigorously in 584 g of water which had been heated to a temperature of 30° C. After 5 minutes a solution of 10 g EDA in 65 g of water was added within 10 minutes. The mixture was stirred at 40° C. to react the isocyanate groups completely until no more NCO could be detected by IR spectroscopy. After cooling, the mixture was filtered through a Seitz T5500 filter. The dispersion formed had the following properties:
Solids content: 38%
Average particle size: 42 nm
pH (10% dilution): 7.3

Dispersion 6 (Comparative, C-3): Aqueous One-Component (1K) Polyurethane Dispersion 439 g of acetone were added to a mixture consisting of 689 g of Kuraray Polyol® P-2020, 80 g of DMPS, and 55 g of 3-MPD at 55° C. 495 g of Desmodur W were added and the reaction mixture was refluxed at a temperature of 70° C. until an NCO content of 2.3% was reached. After cooling down to 60° C. 45 g of TEA added to the prepolymer and homogenized shortly. 550 g of the prepolymer were dispersed whilst stirring vigorously in 606 g of water which had been heated to a temperature of 30° C. After 5 minutes a solution of 5 g of IPDA and 4 g EDA in 52 g of water was added within 10 minutes. The mixture was stirred at 40° C. to react the isocyanate groups completely until no more NCO could be detected by IR spectroscopy. After cooling, the mixture was filtered through a Seitz T5500 filter. The dispersion formed had the following properties:
Solids content: 38.5%
Average particle size: 38 nm
pH (10% dilution): 7.9

Dispersion 7 (Comparative, C-4): Aqueous Aliphatic. Anionic Fatty Acid Modified Polyurethane Dispersion 3200 g of castor oil and 1600 g of soya oil along with 2.0 g of dibutyl tin oxide were weighed into a 5-liter reactor with a distillation column. A nitrogen stream (5 l/h) was passed through the reactants. The mixture was heated to 240° C. within 140 min and cooled after 6 h at 240° C. The OH value was 108 mg KOH/g, the acid value 2.5 mg KOH/g.

165 g of acetone was added to and mixed with a mixture consisting of 45 g of Polyether LP 112® (polypropylene glycol polyether polyol with a mean molecular weight of 1000 g/mol), 133 g of the above-mentioned polyester oligomer precursor, 31 g of dimethylol propionic acid and 16 g of 1,6-hexanediol at 55° C. 257 g of Desmodur W were added and the reaction mixture was refluxed until an NCO content of 5.1% was reached. 550 g of the prepolymer were dispersed whilst stirring vigorously in 697 g of water which had been heated to a temperature of 30° C. After 5 minutes a solution of 11 g of ethylene diamine, 0.5 g diethylenetriamine, and 4.9 g n-butylamine in 65 g of water was added within 5 minutes. The mixture was stirred at 45° C. to react the isocyanate groups completely until no more NCO could be detected by IR spectroscopy. After cooling, the mixture was filtered through a Seitz T5500 filter. The dispersion formed had the following properties:

Solids content: 35.0%
Average particle size: 55 nm
pH (10% dilution): 8.4
Coatings:

EXAMPLE 1

Formulations I-1 and I-2 (invention) and C-1 to C-3 (comparative), based on the dispersions 1, 2 (inventive) and 4 to 6, respectively, were prepared by addition of 32% of N-Methyl-2-pyrrolidoneand (based on Dispersion). Formulations were then prepared as free films of type 5 A, in accordance with DIN EN ISO 527-3 with the drying condition of first 10 minutes at room temperature, then 16 hours at 60° C. Dried films were then subjected to the following tests.

|  | I-1 | I-2 | C-1 | C-2 | C-3 |
|---|---|---|---|---|---|
| Dispersion | I | II | III | IV | V |
| E-Module (MPa) | 820 | 960 | 555 | 630 | 300 |
| Elongation at break (%) | 128 | 93 | 180 | 155 | 166 |

The films prepared from formulations according to the invention (I-1 and I-2) showed improved mechanical properties compared to the films prepared from formulations C-1 to C-3, such as a significant improved E-Module and at the same time lower Elongation at break.

EXAMPLE 2

Formulations I-1 and I-2 (invention) and C-1 to C-3 (comparative) were prepared by addition of 32% of N-Methyl-2-pyrrolidoneand (based on Dispersion). Formulations were then doctor-bladed onto the aluminum substrate so that the dried film thickness was approximately 15 μm. The films were dried first for 10 minutes at room temperature, then for 16 hours at 60° C. Dried films were then subjected to the following tests.

|  | I-1 | I-2 | C-1 | C-2 | C-3 |
|---|---|---|---|---|---|
| Dispersion | I | II | III | IV | V |
| dynamic friction power [N] | 770 | 790 | 850 | 990 | 1040 |
| dynamic friction coefficient $\mu_D$ | 0.385 | 0.395 | 0.425 | 0.495 | 0.520 |

The films prepared from formulations according to the invention (I-1 and I-2) showed also lower dynamic friction power and a lower dynamic friction coefficient compared to the films prepared from formulations C-1 to C-3. Lower friction power on the surface leads to improved surface properties of the coatings such as an improved Rub resistance (see also example 4).

EXAMPLE 3

Formulations I-1 and I-2 (invention) and C-1 to C-3 (comparative) were prepared by addition of 32% of N-Methyl-2-pyrrolidoneand (based on Dispersion). Formulations were then doctor-bladed onto the glass substrate so that the dried film thickness was approximately 15 μm. The films were dried first for 10 minutes at room temperature, then for 16 hours at 60° C. Dried films were then subjected to the following tests.

|  | I-1 | I-2 | C-1 | C-2 | C-3 |
|---|---|---|---|---|---|
| Dispersion | I | II | III | IV | V |
| Micro hardness (N/mm$^2$) Measured only at the surface with the minimum penetration depth | 240 | 110 | 66 | 78 | 66 |
| Micro hardness (N/mm$^2$) Measured with the penetration depth of 1 μm | 160 | 68 | 45 | 60 | 45 |

The films prepared from formulations according to the invention (I-1 and I-2) showed improved Micro hardness compared to the films reared from formulations C-1 to C-3.

EXAMPLE 4

Formulations I-1 and I-2 (invention) and C-1 to C-3 (comparative) were prepared by addition of 32% of N-Methyl-2-pyrrolidoneand (based on Dispersion). Formulations were then doctor-bladed onto the glass (or ABS) substrate so that the dried film thickness was approximately 15 μm. The films were dried first for 10 minutes at room temperature, then for 16 hours at 60° C. Dried films were then subjected to the following tests.

|  | I-1 | I-2 | C-1 | C-2 | C-3 |
|---|---|---|---|---|---|
| Dispersion | I | II | III | IV | V |
| Pencil hardness On glass | H | H | HB | HB | HB |
| König pendulum hardness (s) On glass | 209 | 211 | 196 | 155 | 188 |
| Ethanol rubbing test Double rubs on ABS | 220 | 100 | 80 | 22 | 60 |

The films prepared from formulations according to the invention (I-1 and I-2) showed improved mechanical properties in combination with improved coating properties compared to the films prepared from formulations C-1 to C-3, such as higher hardness in combination with a significantly improved Rub resistance.

EXAMPLE 5

Further formulations C-4 (comparative) and I-3 (invention) were prepared according to the following tables. Amounts given are in weight-parts, unless specified otherwise.

|  | C-4 | I-3 |
|---|---|---|
| Dispersion 3 |  | 88.11 |
| Dispersion 7 | 86.86 |  |
| Byk ® 028 | 1.00 | 1.04 |
| Byk ® 346 | 0.20 | 0.24 |
| Butyl di-glycol/water (1:1) | 11.94 |  |
| Butyl di-glycol |  | 10.60 |
| Solid content (%) | 31.83 | 34.40 |
| Cosolvent content/Dispersion (%) | 6.87 | 12.03 |

EXAMPLE 6

The formulations of example 5 were subjected to the tests as outlined in the following tables. Formulations were doctor-bladed onto the glass (for pendulum hardness), and pinewood substrates (for chemical resistance) in a thickness of 200 μm. The films were dried first at room temperature, unless specified otherwise. Dried films were then subjected to the following tests.

|  |  | C-4 | I-3 |
|---|---|---|---|
| König pendulum hardness (s) | 16 h at 50° C. | 142 | 159 |
| Chemical resistance |  |  |  |
| Drying condition: 67 h, 40° C. |  |  |  |
| water resistance - 5 h | Immediately | 5 | 5 |
|  | After recovery | 5 | 5 |
| Pure EtOH resistance - 5 h | Immediately | 1 | 2 |
|  | After recovery | 1 | 2-3 |
| Double rubs with MEK |  | <5 | >100 |

The films prepared from the formulation according to the invention (I-3) showed improved mechanical properties in combination with improved coating properties on wood compared to the films prepared from formulation C-4, such as high hardness in combination with a significantly improve Rub resistance and resistance against ethanol.

The invention claimed is:

1. An aqueous polyurethane dispersion obtained by the reaction of at least:
 (A) 30 to 60% per weight of one polyisocyanate with two or more isocyanate groups,
 (B) 15 to 50% per weight of one polyester component comprising
  (B1) a polyesterpolyol with a weight average molecular weight of 300 to 900 g/Mol, comprises structural units derived from derived from 3-methyl-1,5 pentandiol,
 (C) 1.5 to 8% per weight of one ionic group introducing compound with at least one sulphonate and/or carboxylate group and at least one isocyanate reactive group,
 (D) 1 to 8% per weight of one diol with a weight average molecular weight of 62 to 400 g/Mol,
 (E) 0.1 to 4% per weight of one polyol with a weight average molecular weight of 62 to 400 g/Mol, having three or more hydroxyl groups,
 (F) 0.5 to 12% per weight of one amino functional and/or aminohydroxyl functional compound, wherein the sum of all percentages adds up to 100.

2. The dispersion according to claim 1, wherein the weight average molecular weight of the polyesterpolyol (B1) is 400 to 800.

3. The dispersion according to claim 1, wherein the polyol component (B) additionally comprises a polyesterpolyol (B2) with a weight average molecular weight of 1000 to 4000 g/Mol, having structural units derived from terephthalic acid.

4. The dispersion according to claim 3, wherein the weight average molecular weight of the polyesterpolyol (B2) is 1500 to 3500.

5. The dispersion according to claim 3, wherein the polyesterpolyol (B2) comprises structural units derived from 3-methyl-1,5 pentandiol.

6. The dispersion according to claim 3, wherein the ratio between the polyesterpolyol (B1) and the polyesterpolyol (B2) is between 100:0 to 40:60.

7. The dispersion according to claim 1, wherein the polyisocyanate (A) has two isocyanate groups.

8. The dispersion according to claim 1, wherein the ionic group introducing compound (C) comprises N-(2-aminoethyl)-2-aminoethane sulphonate and/or dimethylol propionic acid.

9. The dispersion according to claim 1, wherein the diol (D) comprises one or more compounds selected from the group consisting of ethanediol, di-ethyleneglycol, tri- ethyleneglycol, tetraethyleneglycol, 1,2-propanediol, di-propyleneglycol, tri-propyleneglycol, tetrapropyleneglycol, 1,3-propanediol, butanediol-1,4, butanedio-1,3, butanediol-2,3, pentanedio-1,5, hexanedio-1,6, 2,2-dimethyl-1,3-propanediol, 1,4-dihydroxycyclohexane, 1,4-dimethylolcyclohexane, octanedio-1,8, decanediol-1,10, dodecanediol-1,12, neopentylglycol, 1,4-cyclohexanediol, 1,4-cyclohexane-dimethanol, 1,4-, 1,3-, 1,2-dihydroxybenzene, 2,2-bis-(4-hydroxyphenyl)-propane (bisphenol (A)), and 3-Methyl-1,5-pentandiol.

10. The dispersion according to claim 1, wherein the polyol (E) comprises one or more compounds selected from the group consisting of trimethylolpropane, glycerine, pentaerythrite, and dipenthaerytrite.

11. The dispersion according to claim 1, wherein the amino functional and/or aminohydroxyl functional compound (F) comprises one or more compounds selected from the group consisting of 1,2-ethanediamine, 1-amino-3,3,5-trimethyl-5-aminomethyl-cyclohexane, diethylenetriamine, diethanolamine, ethanolamine, N-(2-hydroxyethyl)-ethylenediamine and N,N-bis(2-hydroxyethyl)-ethylenediamine.

12. A method comprising coating a substrate with the dispersion according to claim 1.

13. A coating obtained by applying the dispersion according to claim 1.

14. The dispersion according to claim 1, wherein the polyisocyanate (A) comprises one or more compounds selected from the group consisting of hexamethylene diisocyanate, 1,4-diisocyanatocyclohexane, 1-isocyanato-3,3,5-trimethyl-5-isocyanatomethyl-cyclohexane, 4,4'-diisocyanato-dicyclohexyl-methane, and 4,4'-diisocyanato-dicyclohexylpropane-(2,2).

* * * * *